United States Patent [19]

Bobsein et al.

[11] Patent Number: 4,560,817

[45] Date of Patent: Dec. 24, 1985

[54] HYDROGENATION CATALYST

[75] Inventors: Rex L. Bobsein; Marvin M. Johnson, both of Bartlesville, Okla.

[73] Assignee: Phillips Petroleum Company, Bartlesville, Ohio

[21] Appl. No.: 585,666

[22] Filed: Mar. 2, 1984

[51] Int. Cl.$^4$ .......................... C07C 5/05; C07C 5/03; C07C 5/00

[52] U.S. Cl. ................................. 585/273; 585/275; 585/276; 585/277; 585/255; 208/145; 525/339

[58] Field of Search ............... 585/255, 273, 275, 276, 585/277; 208/145, 143; 502/171, 327; 525/339

[56] References Cited

U.S. PATENT DOCUMENTS 3,697,449 10/1972 Brake .................................. 502/171
4,337,329 6/1982 Kubo et al. ......................... 525/339

FOREIGN PATENT DOCUMENTS 0153821 2/1982 Fed. Rep. of Germany ...... 585/273
2011911 7/1979 United Kingdom .

OTHER PUBLICATIONS

Mark et al., "Alkoxides, Metal", Kirk–Othmer Encyclopedia of Chemical Technology, a Wiley–Interscience Publication, vol. 2, 3rd Edition, 1978, pp. 11 and 12.

Primary Examiner—John Doll
Assistant Examiner—Chung K. Pak
Attorney, Agent, or Firm—Howard D. Doescher

[57] ABSTRACT

The hydrogenation of olefin polymers and especially diene polymers can be carried out effectively using a catalyst containing a Group VIII metal, a metal alkoxide and a support, optionally in the presence of a nitrogen-containing ingredient to inhibit aromatic hydrogenation.

10 Claims, No Drawings

HYDROGENATION CATALYST

This invention relates to novel catalysts and to the use of these catalysts for the hydrogenation of diene-containing polymers. In accordance with one aspect, this invention relates to a Group VIII metal-containing catalyst promoted with at least one of an alkali metal or alkaline earth alkoxide. In accordance with a further aspect, this invention relates to the further promotion of the promoted catalyst with at least one basic nitrogen-containing material. In another aspect, this invention relates to the hydrogenation of diene-containing polymers with at least one of the promoted catalysts of the invention.

BACKGROUND

The hydrogenation of diene-containing polymers, such as butadiene-styrene copolymers and the like, yield substances of greater saturation and, consequently, greater stability when used for certain applications. Rheological additives, for example, viscosity index improvers, are one class of compounds produced by the saturation of diene polymers.

There is a continuing effor to develop improved hydrogenation catalysts and processes to selectively hydrogenate diene-containing polymers to hydrogenated polymeric products having desirable properties. The present invention is directed to a catalyst system and process for hydrogenating olefin polymers, especially diene-vinyl aromatic copolymers, to form polymers having reduced trans unsaturation and vinyl unsaturation, but with little change in aromatic unsaturation.

OBJECTS

It is one object of the invention to provide a catalyst composition useful for the hydrogenation of diene-containing polymers.

It is another object of the invention to provide a process for the hydrogenation of olefin polymers via the use of the catalysts of the invention.

SUMMARY OF INVENTION

It has been discovered that the hydrogenation or saturation of diene-containing polymers can be carried out more efficiently in the presence of certain catalyst compositions, with the optional use of modifiers.

In accordance with the invention, a catalyst effective for hydrogenation of olefin polymers, especially diene-containing polymers, is provided comprising a supported Group VIII metal, especially noble metal, promoted with at least one alkali metal or alkaline earth metal alkoxide.

Further in accordance with the invention, olefin polymers and particularly diene-containing polymers, such as butadiene-styrene copolymers, are hydrogenated by contacting the polymer with a supported Group VIII catalyst promoted with an alkali metal or alkaline earth metal alkoxide in the presence of a basic nitrogen-containing substance as an aromatic hydrogenation inhibitor.

In one embodiment, the process of hydrogenating olefinic polymers such as butadiene-styrene copolymers is improved by using a platinum group metal-/alumina/alkali metal alkoxide catalyst, e.g., Pd/Al$_2$O$_3$/LiOCH$_3$, at 100°-200° C. and 200-700 psig H$_2$ pressure.

In another embodiment, the hydrogenation of butadiene-styrene copolymer yields a product in which the olefinic group is hydrogenated to more than 95 percent and the phenyl group is hydrogenated to less than 5 percent using a catalyst system of Pd/Al$_2$O$_3$/LiOCH$_3$ and a nitrogen-containing modifier, e.g., NH$_3$. Other catalysts of platinum group metals and salts of alkali metal cations—i.e., strongly based cations supported on alumina can be used in the presence of ammonia or an amine.

ADVANTAGES

The catalyst compositions and processes of the invention have several advantages over the prior art. They provide a method for the hydrogenation of olefin polymers to produce useful products under controlled conditions. Furthermore, when optional ammonia or amine modifier is used and the polymer substrate contains aromatic groups, the inventive catalyst and method yields selective hydrogenation, so that hydrogenation of aromatic rings is minimized.

Other advantages and aspects of the invention will become apparent from a consideration of the following description.

DETAILED DESCRIPTION OF THE INVENTION

Catalyst

The catalyst compositions of the invention comprise, as essential components, (a) a Group VIII metal, (b) at least one alkali or alkaline earth metal alkoxide, and (c) a support component.

component (a) will generally contain at least one Group VIII element. Among the useful metals are iron, cobalt, nickel, rhodium, palladium, iridium, and platinum. Platinum and palladium are preferred, with palladium highly preferred. Mixtures of Group VIII metal containing ingredients are operable. The amount of Group VIII metal present in the catalyst can vary appreciably, but generally will range from about 0.1 to about 10 weight percent of the total catalyst composition. Noble metals are generally used in amounts ranging from about 0.1 to about 5 weight percent.

Component (b) of the instant catalyst contains at least one alkali or alkaline earth metal alkoxide conforming to the formula X(OR)$_n$ wherein X is a metal selected from Group IA or group IIA of the Periodic Table, R is an alkyl group containing from about 1 to about 10 carbon atoms, preferably about 1 to about 4 carbon atoms, and n is 1 or 2. The amount of metal alkoxide combined with the supported Group VIII metal composite can vary appreciably but generally will range from about 0.5 to about 50 weight percent of the total catalyst composition. Preferred amounts will range from about 1 to about 10 weight percent.

Preferred metal alkoxides are the alkoxides of alkali metals with alkoxides of lithium being highly preferred. Useful alkyl groups include methyl, ethyl, tertiary butyl, isopropyl, and the like. Methyl groups are highly preferred. Mixtures of metal alkoxides are operable, as are mixed alkoxides of alkali and alkaline earth metals. While component (b) is generally regarded as part of the catalyst system, it can be employed as an additive to the polymer feed.

Component (c) of the catalyst will generally be any inert substrate which will function as a support for components (a) and (b) herein. The support comprises the balance of the catalyst composition in addition to the Group VIII metal (a) and the alkoxide (b).

Preferred supports include silica, silica-alumina, and alumina. While alumina is generally operable, it is preferred that the Calsicat E-149-SD type (Calsicat Division, Mallinckrodt, Inc., Erie, PA) of alumina be employed herein. Mixtures of various supports are operable.

While the surface area of the catalyst is not a critical limitation, it is generally preferred to employ catalyst compositions whose surface areas are in the range of about 1 to about 500 M$^2$/g, with about 20 to about 200 M$^2$/g highly preferred.

A fourth, (d), component is optional. This optional component is generally at least one basic nitrogen-containing substance, with ammonia and amines preferred. While ammonia is highly preferred, amines conforming to the general formula R$_1$R$_2$R$_3$N, wherein each of R$_1$, R$_2$, and R$_3$ is independently selected from hydrogen, straight chain alkyl groups containing from 1 to 10 carbon atoms, cyclic groups containing from 3 to 10 carbon atoms and branched alkyl groups containing from 3 to 10 carbon atoms are also operable. Cyclic amines are also operable. Mixtures of nitrogen-containing components can be employed.

When ammonia is used, it is generally supplied in a gaseous state. Preferably, it is prior to the introduction of hydrogen.

When amines are employed they are generally added in liquid form to the reactor.

The nitrogen-containing component is generally regarded as part of the catalyst system. However, it is somtimes preferred to employ the ammonia or amine as an additive to the polymer feed, to the hydrogen supply, or to both. When gaseous materials are used as component (d), they are supplied at pressures of less than 100 psig with about 25 psig preferred.

The amount of basic nitrogen-containing component present as part of the catalyst system or introduced separately into the reaction mass will be sufficient to substantially inhibit aromatic hydrogenation but insufficient to inhibit olefin (vinyl) hydrogenation activity of the catalyst. Thus, the amounts used for practical reasons generally will be about 0.01 to about 10 mole ratio of basic nitrogen-containing component to aromatic component of polymer.

The relative quantities of each of components (a) through (d) employed in the catalyst of the invention can vary within wide limits. Generally, the quantities employed will depend upon such variables as the olefin polymer reactant, the hydrogen concentration and the reaction vessel used.

Olefin Polymers

The polymerized substrates to be hydrogenated in accordance with the invention are generally olefin polymers which can be either quenched or living polymers. Preferably the olefin polymer feeds are diene-containing polymers and copolymers with aromatic/diene copolymers highly preferred. Useful diene moieties include any conventional polyunsaturated monomers containing from about 3 to about 12 carbon atoms. Butadiene is preferred. Useful aromatic monomers include mono- and polyvinyl substituted aromatic compounds. Styrene and divinyl benzene are preferred, with styrene highly preferred. Mixtures of aromatic and/or diolefin monomers can be used, along with the optional inclusion of conventional olefinic monomers of other types, in the preparation of the polymeric substrate.

The relative quantities of aromatic and diene monomers used in preparing aromatic/diene copolymers for use as feeds herein will generally lie between about 10 wt. % and about 90%, with about 40 to about 75 preferred for aromatic monomers; and between about 10% and about 90%, with about 40 to about 75 preferred for diene monomers. The optional inclusion of other monomers is also contemplated. Mixtures of polymeric substrates can be employed.

In accordance with one aspect of the invention, "living", e.g., Li-terminated, polymers are used.

Hydrogenation Conditions

The hydrogenation reaction carried out in accordance with the invention involves the use of quantities of hydrogen necessary to react with significant numbers of the unsaturated bonds present in the polymeric substrate. Generally, hydrogenation of trans unsaturation, vinyl unsaturation, and styrene unsaturation will take place during the hydrogenation reaction. By "styrene unsaturation" applicants mean aromatic unsaturation present in the ring structure of any aromatic component, e.g., styrene.

Typically, about 95%, and preferably about 100%, of the olefinic unsaturation will be hydrogenated, with about 5%, and preferably about 0%, of the aromatic unsaturation being hydrogenated as well.

Hydrogen or hydrogen-containing reactant(s) will be supplied to the reaction at pressure about 500 psig. Preferably the hydrogenation reaction takes place at a temperature in the range of about 100°–200° C. and about 200–700 psig H$_2$ pressure over a period of about one half hour to about twelve hours, with times of about 3 to about 5 hours preferred. While hydrogen gas is a preferred source of hydrogen atoms for the reaction, other conventional hydrogen donors are operable herein. Mixtures of hydrogen sources can be employed.

The reaction vessel employed in the process of the invention is generally any vessel which will afford efficient contacting of the catalyst composition with the reactants, i.e., the hydrogen source(s) and polymer substrate(s) to be used.

The polymers of the invention can be hydrogenated directly in their normal non-viscous to viscous form, or they, as well as solid polymers, can be hydrogenated in the form of a solution or a dispersion in a suitable solvent which preferably is not hydrogenatable. In the bases where the polymeric material is dissolved in a solvent, it is somewhat more economical to separate the polymeric material after hydrogenation and reuse the solvent. The hydrogenation is preferably carried out in a batch-wire process. When sufficient hydrogenation has been effected, usually as indicated by a decrease in unsaturation or a drop in hydrogen pressure, the reaction is stopped and the dispersion or solution treated by suitable means, such as by filtering, centrifuging, and the like, to remove the catalyst. The extent of hydrogenation of the olefinic bonds and of the phenyl groups in the polymers treated can be determined by infrared analysis before and after hydrogenation.

The following examples are presented in further illustration of the invention.

Inventive palladium-containing hydrogenation catalysts used in Examples I and II were prepared by impregnating commercial palladium-alumina (Catalyst I) with lithium methoxide. The properties and preparation of each of these catalysts follows.

Catalyst I (Control)

Calsicat E 144SD, a commercial catalyst* with 0.5 wt% Pd on type SD $Al_2O_3$ spheres.
*Calsicat Division of Mallenckrodt Inc., Erie, PA.

Physical properties of SD $Al_2O_3$ include:

| | |
|---|---|
| surface area = | 30–40 $m^2$/g |
| bulk density = | 0.8 g/cc |
| pore volume = | 0.50 cc/g |
| % of pore volume: | |
| >10,000 = | 4% |
| 1,000 to 10,000 A = | 12% |
| 500 to 1,000 A = | 32% |
| 100 to 500 A = | 51% |
| <100 A = | 1% |

Catalyst II (Inventive)

$LiOCH_3/0.5\%$ $Pd/Al_2O_3$ (impregnated with $LiOCH_3$). A portion of Catalyst I (36.2 g) was heated in a flask, evacuated and flushed with argon. $LiOCH_3$ (0.59 g) was added under argon to the flask; then 100 mL degassed methanol was added to dissolve the $LiOCH_3$ and to impregnate Catalyst I. The solvent was then removed with a rotary evaporator, and the resultant inventive Catalyst II was stored under argon.

Catalyst III (Inventive)

$LiOCH_3/0.3\%$ $Pd/Al_2O_3$ (impregnated with $LiOCH_3$). Calsicat E 143SD (375.3 g), a commercial catalyst with 0.3 wt % Pd on SD $Al_2O_3$ spheres, was poured into a flask, heated, evacuated and flushed with argon. $LiOCH_3$ (2.44 g) and 300 mL degassed methanol were added to the flask under argon to impregnate the catalyst. The solvent was then removed with a rotary evaporator and the resultant catalyst III was stored under argon.

EXAMPLE I

Comparative Hydrogenation Runs

Catalyst I, Catalyst II, and mixtures of Catalyst I with varying amounts of $LiOCH_3$ were used in runs to hydrogenate a solution of lithiated (live) polymer cement of 40 butadiene: 60 styrene (wt.%) copolymer having $M_n$ 50,000–90,000 and a concentration of 12.6 wt. percent in cyclohexane. Polymers were analyzed before and after hydrogenation for olefinic unsaturation by infrared spectrocopy and for aromatic content by ultraviolet spectroscopy. Before being hydrogenated, analysis of the polymer showed 18.9% trans olefin, 10.0% vinyl olefin, and 61.3% styrene. Hydrogenation of cis and vinyl unsaturation proceeds more readily than that of trans unsaturation.

Hydrogenation runs were made in a 300 mL stainless steel stirred autoclave. Ten grams of catalyst was poured into the autoclave reactor under inert gas, such as argon, then 175 mL of the butadiene-styrene copolymer cement was added. The system was sealed, evacuated, and charged with hydrogen. The mixture was stirred at 900–1700 rpm and heated to the specified temperature for 4.5 hr.

The reaction mixture was cooled, filtered to remove catalyst, and treated with methanol to precipitate the polymer, which was subsequently vacuum dried at 107° C.

Table I shows runs made with Catalyst I (Runs 1–3), Catalyst II (Runs 4–5), and $LiOCH_3$ dry mixed with Catalyst I (Runs 6–8) in the reactor.

TABLE I

| Run No. | Catalyst | Maximum Reaction Temp °C. | Maximum Reaction Pressure psig | Stirring Rate, (rpm) | Time Hrs. | Polymer Product Analysis | | |
|---|---|---|---|---|---|---|---|---|
| | | | | | | Trans % | Vinyl % | Styrene % |
| 1* | I | 167 | 645 | — | 2.0 | 18.5 | 8.6 | 61.1 |
| 2 | I | 161 | 572 | 940 | 4.5 | 9.3 | 3.9 | 52.7 |
| 3 | I | 162 | 552 | 1610 | 4.5 | 1.3 | 0.0 | 45.2 |
| 4 | II** | 161 | 522 | 1610 | 4.5 | 1.0 | 0.0 | 43.0 |
| 5 | II*** | 161 | 268 | 1610 | 4.5 | 2.0 | 0.0 | 57.8 |
| 6 | I + 0.45 g $LiOCH_3$ | 161 | 602 | 1610 | 4.5 | 0.6 | 0.0 | 40.9 |
| 7 | I + 0.14 g $LiOCH_3$ | 160 | 520 | 1610 | 2.0 | 1.8 | 0.0 | 51.7 |
| 8 | I + 0.15 g $LiOCH_3$ | 102 | 235 | 1230 | 4.5 | 15.6 | 8.4 | 60.8 |

*polymer precipitated with methanol and dried (to remove lithium) then 4.81 g redissolved in cyclohexane (77 g total) (stirring rate not determined)
**15 g catalyst
***13 g catalyst The run data showed:

(1) Enhancing effect of presence of lithium: Compare Runs 1 and 2, no lithium to lithiated live polymer. Compare Runs 3 and 6, additional $LiOCH_3$ boosts activity from 1.3% trans to 0.6% trans.

(2) Effect of stirring rate: Compare Runs 2 and 3. Implies more catalyst contact.

(3) Effect of pressure reduction: See Runs 5 and 8.

(4) Effect of precoating catalyst with $LiOCH_3$: See Runs 4 and 5.

EXAMPLE II

Hydrogenation Runs with $NH_3$ Added

These hydrogenation runs were made using Catalyst I and Catalyst III as in Example I except the first charge of gas after sealing the autoclave was 25 psig anhydrous ammonia. Hydrogen at 500 psig was charged additionally and the reaction carried out as in Example I.

Table II shows the results.

TABLE II

| Run No.* | Catalyst | Catalyst Weight, g. | Maximum Reaction Temp °C. | $NH_3$ psig | Maximum Reaction Pressure psig | Stirring Rate (RPM) | Polymer Product Analysis | | |
|---|---|---|---|---|---|---|---|---|---|
| | | | | | | | Trans % | Vinyl % | Styrene % |

TABLE II-continued

| 9  | III | 20.6 | 162 | 25 | 500 | 1610 | 1.3  | 0.0 | 59.9 |
|----|-----|------|-----|----|-----|------|------|-----|------|
| 10 | III | 11.1 | 161 | 35 | 560 | 1610 | 10.6 | —   | 60.4 |
| 11 | I   | 20.0 | 162 | 20 | 520 | 1610 | 2.2  | 0.0 | 49.0 |

These data and those of Table I (Runs 4, 5) show the addition of $NH_3$ makes the hydrogenation most selective using the Catalyst III. Run 10 shows too much $NH_3$ inhibits olefin hydrogenation activity. Note improvement of Run 9 compared to Run 11 ($LiOCH_3$ to none).
*Parent Polymers

|        | % Trans | % Vinyl | % Styrene |
|--------|---------|---------|-----------|
| Run 9  | 18.9    | 10.0    | 61.3      |
| Run 10 | 17.8    | 9.9     | 59.8      |
| Run 11 | 18.2    | 10.2    | 60.1      |

Molecular weight and concentration of polymers are similar to those used in Example II.

Reasonable variations, such as those which would occur to a skilled artisan, can be made herein without departing from the scope of the invention.

We claim:

1. A process for hydrogenating olefin polymers containing phenyl and olefin unsaturation comprising contacting same with hydrogen and ammonia or organic amine in the presence of a catalyst composition consisting essentially of
   (a) platinum or palladium,
   (b) from about 0.5 to about 50 weight percent of the total composition of at least one alkali or alkaline earth metal alkoxide wherein the alkyl portion contains from 1 to about 10 carbon atoms, and
   (c) a support component chosen from group consisting of silica, silica-alumina, and alumina.

2. A process according to claim 1 wherein (a) is palladium, (b) is lithium methoxide, and (c) is alumina.

3. A process for hydrogenating diene polymers containing phenyl and vinyl unsaturation comprising contacting same with hydrogen and ammonia or organic amine under conditions to produce a hydrogenated polymeric product substantially free of vinyl unsaturation but with little change in aromatic (phenyl) unsaturation in the presence of a catalyst composition consisting essentially of (a) platinum or palladium, (b) from about 0.5 to about 50 weight percent of the total composition of at least one alkali or alkaline earth metal alkoxide wherein the alkyl portion contains from 1 to about 10 carbon atoms, and (c) a support component chosen from group consisting of silica, silica-alumina, and alumina.

4. A process according to claim 3 wherein said diene polymer is a butadiene-styrene copolymer.

5. A process according to claim 3 wherein said contacting is carried out in the presence of a sufficient amount of about 0.01 to about 10 mole ratio of ammonia or oranic amine to aromatic component of the polymer to inhibit aromatic hydrogenation and produce a polymeric product substantially free of vinyl unsaturation but with little change in aromatic unsaturation.

6. A process according to claim 3 whrein (b) is lithium alkoxide.

7. A process for hydrogenating diene-vinyl aromatic copolymers comprising contacting same with hydrogen and in the presence of at least one of ammonia or organic amine with a catalyst consisting essentially of
   (a) platinum or palladium,
   (b) from about 1 to about 10 weight percent of the total composition of at least one alkali or alkaline earth metal alkoxide, wherein the alkyl portion contains from 1 to about 4 carbon atoms, and
   (c) a support component chosen from group consisting of silica, silica-alumina, and alumina.

8. The process of claim 7 wherein (a) is palladium, (b) is lithium methoxide, and (c) is alumina.

9. A process according to claim 8 wherein said copolymer is a butadiene-styrene copolymer and said hydrogenating is carried out in the presence of ammonia.

10. A process according to claim 7 wherein hydrogenation is carried out in the presence of about 0.01 to about 10 mole ratio of ammonia or organic amine to aromatic component of the copolymer.

* * * * *

UNITED STATES PATENT AND TRADEMARK OFFICE
CERTIFICATE OF CORRECTION

PATENT NO. : 4,560,817

DATED : DECEMBER 24, 1985

INVENTOR(S) : REX L. BOBSEIN and MARVIN M. JOHNSON

It is certified that error appears in the above-identified patent and that said Letters Patent is hereby corrected as shown below:

Claim 5, line 4, delete "oranic" and insert ---organic---.

Signed and Sealed this

Ninth Day of September 1986

[SEAL]

Attest:

DONALD J. QUIGG

Attesting Officer   Commissioner of Patents and Trademarks